(12) United States Patent
Harris

(10) Patent No.: US 7,290,383 B2
(45) Date of Patent: Nov. 6, 2007

(54) TRIMMER BLADE

(76) Inventor: David Harris, 1410 Flightline Dr., Suite D, Lincoln, CA (US) 95648

( * ) Notice: Subject to any disclaimer, the term of this patent is extended or adjusted under 35 U.S.C. 154(b) by 0 days.

(21) Appl. No.: 10/933,953

(22) Filed: Sep. 3, 2004

(65) Prior Publication Data

US 2006/0048492 A1    Mar. 9, 2006

(51) Int. Cl.
*A01D 34/52* (2006.01)
*A01D 34/73* (2006.01)

(52) U.S. Cl. ...................................... 56/255
(58) Field of Classification Search ............. 56/12.7, 56/17.2, 255, 295; 30/276, 347, 300
See application file for complete search history.

(56) References Cited

U.S. PATENT DOCUMENTS

| | | | |
|---|---|---|---|
| 300,858 A * | 6/1884 | Feicker | 7/168 |
| 1,039,260 A * | 9/1912 | Cooper | 7/118 |
| 2,255,930 A * | 9/1941 | Jepson | 30/151 |
| 3,103,093 A | 9/1963 | House, Jr. | |
| 3,176,455 A * | 4/1965 | Buchanan | 56/295 |
| 3,321,894 A * | 5/1967 | Ingram | 56/295 |
| 3,346,955 A * | 10/1967 | Beneke | 30/276 |
| 3,399,519 A * | 9/1968 | Buchanan | 56/295 |
| 3,500,622 A * | 3/1970 | Bowen | 56/295 |
| 3,911,652 A * | 10/1975 | Houle | 56/295 |
| 4,107,841 A * | 8/1978 | Rebhun | 30/276 |
| 4,114,354 A * | 9/1978 | Morris | 56/295 |
| 4,215,451 A * | 8/1980 | Wikoff | 452/133 |
| 4,229,933 A * | 10/1980 | Bernard | 56/295 |
| 4,250,620 A | 2/1981 | Nishikawa | |
| 4,270,271 A * | 6/1981 | Feldman et al. | 30/276 |
| 4,300,336 A * | 11/1981 | Miyata | 56/295 |
| 4,313,297 A * | 2/1982 | Maier | 56/295 |
| 4,594,843 A * | 6/1986 | Andersson et al. | 56/295 |
| 4,815,264 A * | 3/1989 | Mijnders | 56/295 |
| 4,938,012 A | 7/1990 | Klima | |
| D316,220 S * | 4/1991 | Ailey et al. | D8/66 |
| 5,239,755 A * | 8/1993 | Kramer | 30/264 |
| RE34,815 E * | 1/1995 | Byrne | 172/15 |
| 5,423,126 A * | 6/1995 | Byrne | 30/276 |
| 5,430,943 A | 7/1995 | Lee | |
| 5,491,962 A | 2/1996 | Sutliff et al. | |
| 5,640,836 A | 6/1997 | Lingerfelt | |
| D390,240 S | 2/1998 | Walden | |
| 5,791,131 A * | 8/1998 | Hill et al. | 56/295 |
| 5,845,405 A | 12/1998 | Rosdahl | |
| 5,852,876 A * | 12/1998 | Wang | 30/276 |
| 5,862,598 A | 1/1999 | Lee | |
| D406,503 S | 3/1999 | Schultz et al. | |
| 6,052,907 A | 4/2000 | Wang | |
| 6,112,416 A * | 9/2000 | Bridges et al. | 30/276 |
| 6,122,832 A | 9/2000 | Lee | |
| 6,249,978 B1 * | 6/2001 | Sheldon | 30/276 |

(Continued)

*Primary Examiner*—Árpád Fábián Kovács
(74) *Attorney, Agent, or Firm*—Matthew J. Temmerman; Temmerman Law Office

(57) ABSTRACT

A trimmer blade assembly comprising a blade within a housing is provided. The housing includes a wall for propelling cut vegetation away from the blade assembly. The blade assembly may also include a ridge on the housing for further propulsion of cut vegetation away from the trimmer blade. The present blade cuts vegetation more efficiently since cut vegetation will generally be propelled away from the blade by the perpendicular wall and ridge.

12 Claims, 2 Drawing Sheets

U.S. PATENT DOCUMENTS 6,427,341 B1  8/2002  Lee
2002/0193049 A1* 12/2002 Boucher et al. .............. 451/12

2003/0196332 A1  10/2003  Harris et al.

* cited by examiner

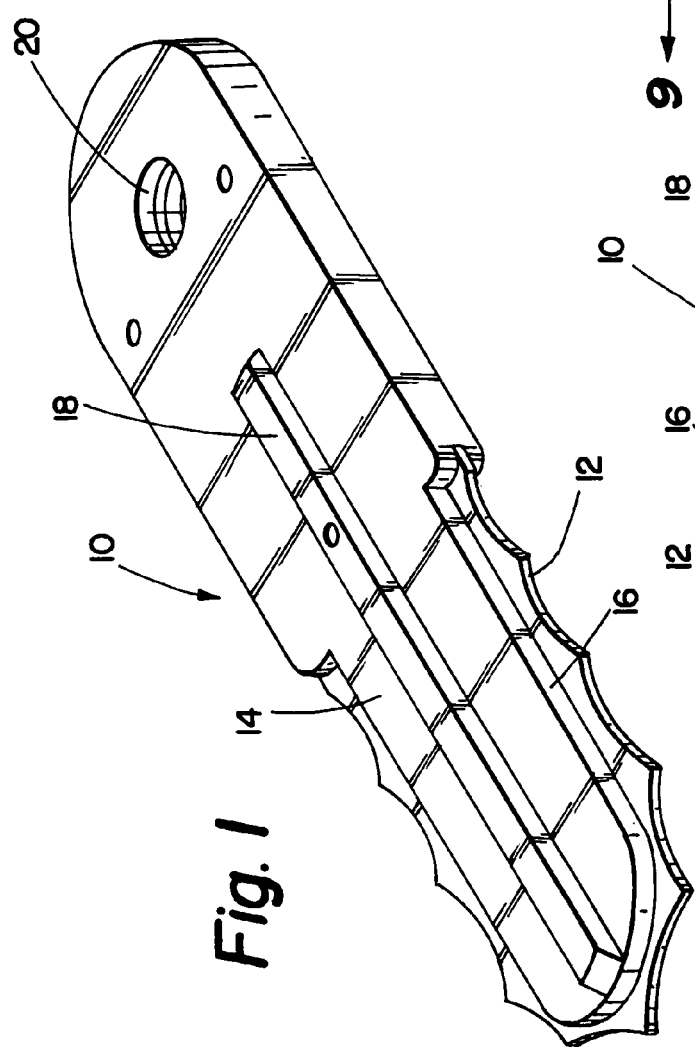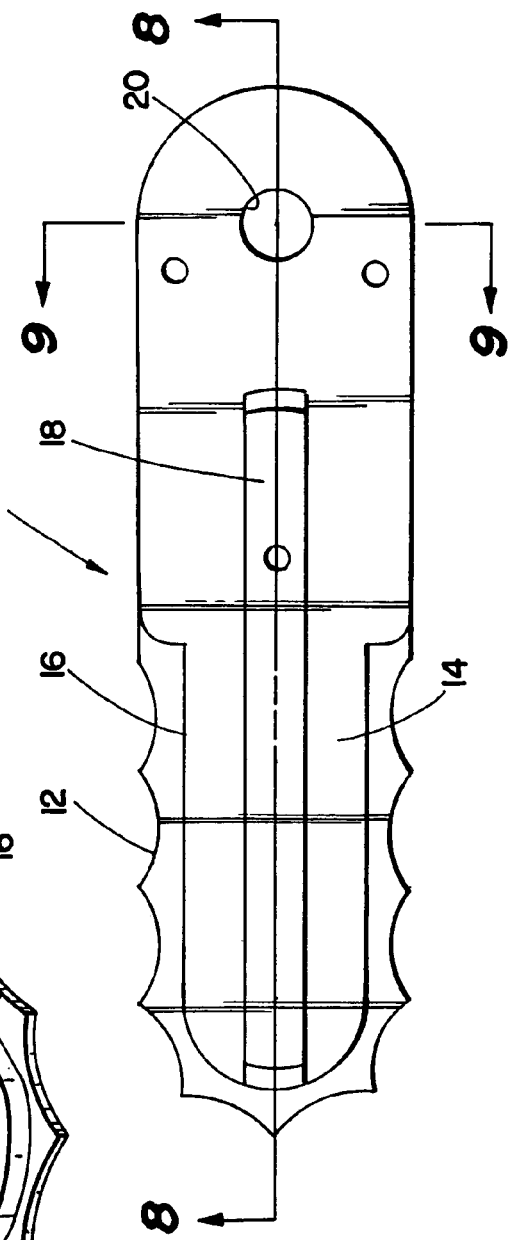

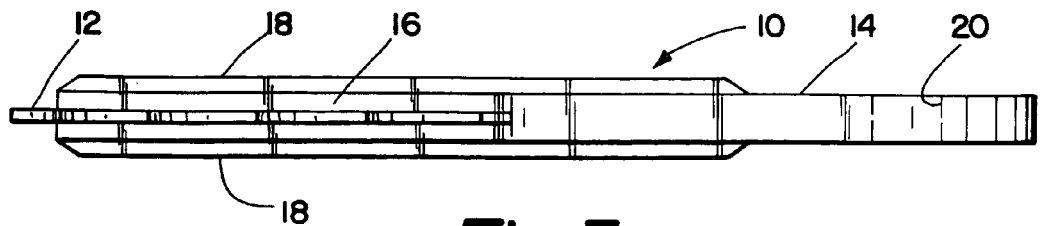
Fig. 3
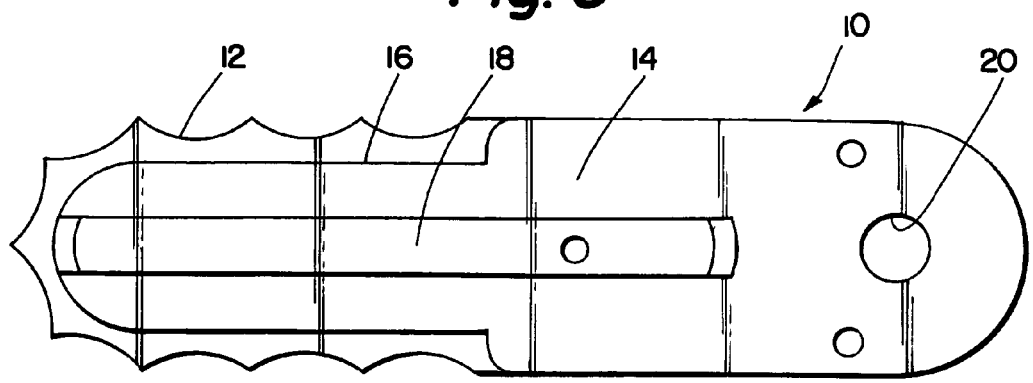
Fig. 4
Fig. 5
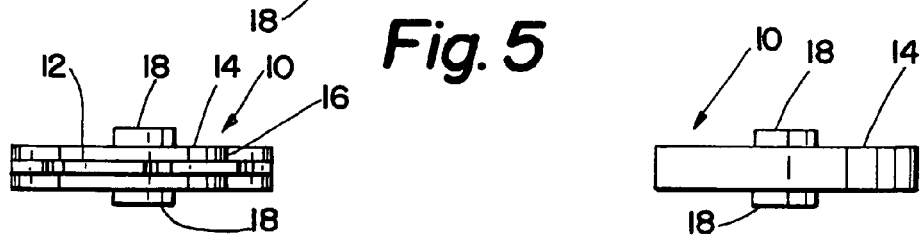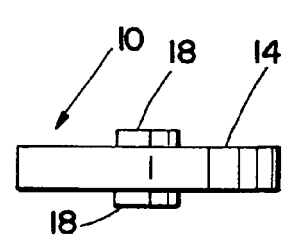
Fig. 6  Fig. 7
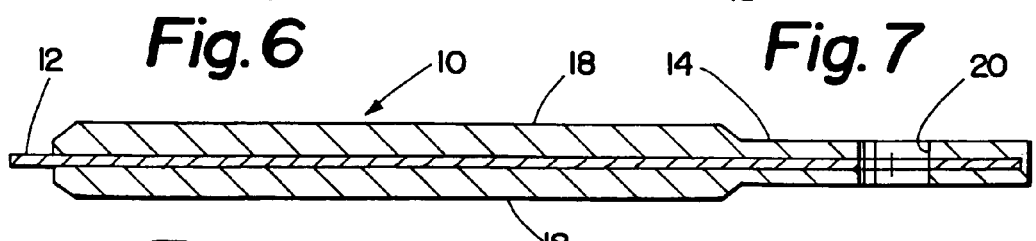
Fig. 8
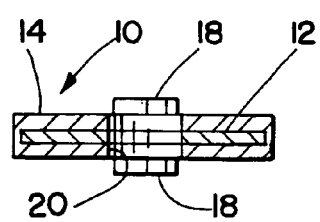
Fig. 9

TRIMMER BLADE

BACKGROUND OF THE INVENTION

1. Field of the Invention

This invention relates to trimmer blades.

2. General Background

Many vegetation trimmers have blades made of hard plastic or metal instead of string or line. Traditional trimmer blades have been unable to propel the cut vegetation away from the blade and the user. Instead, traditional blades have tended to propel the weeds, grass, and other cut vegetation up towards the user, rather than directly away. Thus, there is a need for a trimmer head that generally propels the cut vegetation away from the blade and the user, thereby reducing the amount of debris that strikes the user.

SUMMARY OF THE INVENTION

The present invention is a trimmer blade, comprising a blade with a housing, wherein the housing forms a perpendicular wall at the interface between the blade and the housing. This flat wall generally propels the cut vegetation away from the trimmer blade and the user. A ridge may also be placed on the housing to further enhance the blade's ability to distribute the cut vegetation away from the blade.

BRIEF DESCRIPTION OF THE DRAWINGS

FIG. 1 is a perspective view of a blade assembly according to an embodiment of the present invention.

FIG. 2 is a bottom view of a blade assembly according to an embodiment of the present invention.

FIG. 3 is a left side view of a blade assembly according to an embodiment of the present invention.

FIG. 4 is a top view of a blade assembly according to an embodiment of the present invention.

FIG. 5 is a right side view of a blade assembly according to an embodiment of the present invention.

FIG. 6 is a front view of a blade assembly according to an embodiment of the present invention.

FIG. 7 is a back view of a blade assembly according to an embodiment of the present invention.

FIG. 8 is a cross-section taken along lines 8-8 of FIG. 2.

FIG. 9 is a cross-section taken along lines 9-9 of FIG. 2.

DETAILED DESCRIPTION

The present invention is a blade assembly comprising (1) a blade, (2) a housing, and (3) a substantially perpendicular wall in the housing at the housing's interface with the blade. The blade assembly also optionally contains a ridge with a perpendicular surface on the housing, and may contain a bore for attachment to a trimmer head.

The blade assembly 10 of the present invention has a blade 12 for cutting vegetation. See FIGS. 1-6, 7-9. The blade 12 may be serrated, as shown in the embodiment depicted in the figures. It also may be non-serrated. As shown in FIGS. 7, 8, and 9, in one embodiment the blade 12 extends through the entire blade assembly 10.

The blade 12 may be made of metal, ceramic, plastic, or any other suitable material.

The housing 14 covers some but not all of the blade 12. In one embodiment, the housing 14 is molded around the blade 12. The housing may be made of plastic, or other suitable materials, including ceramics, metals, etc. In one embodiment, as shown in the attached figures, the blade is separate from the housing, and the housing is molded around the blade. In another embodiment, the housing and the blade may be integrated into a single unit.

A perpendicular wall 16 is placed at the interface between the blade 12 and the housing 14, as shown best in FIG. 1. This wall forms a substantially 90-degree angle with the blade 12. When the cut vegetation hits this perpendicular wall 16, it is propelled directly away from the blade assembly 10. By providing a perpendicular rather than sloped wall between the blade 12 and the housing 14, the trimmer blade of the present invention maximizes the ability of the blade assembly to propel cut vegetation away from the user, for the same reason that a 1-iron in golf can drive the ball farther than a 7-iron. If the wall were sloped, it would not have the same ability to maximize the propulsion of the cut vegetation away from the user.

A ridge 18 may be provided in the housing 14. The ridge 18 may have a perpendicular surface similar to the wall 16, for propelling cut vegetation away from the blade. See FIGS. 1 and 5.

To attach the blade to a trimmer head, a bore 20 may be provided. See FIGS. 1, 2, 4.

In operation, the blade assembly 10 of the present invention would be installed on a trimmer head, and then used in the ordinary fashion. As the blade 12 cuts the vegetation, the cut vegetation then bounces off the perpendicular wall 16 and also off the optional ridge 18. The blade 12 serves the entire cutting function, and the perpendicular wall 16 and plastic housing 14 serve no cutting function.

One skilled in the art will appreciate that the present invention can be practiced by other than the preferred embodiments, which are presented for purposes of illustration and not of limitation.

I claim:

1. A method of cutting vegetation, comprising:

providing a trimmer head comprising a shaft axis about which rotate at least two rotatable trimmer blade assemblies, each assembly comprising:

a substantially planar cutting blade substantially encased in a blade housing, said cutting blade having a leading side and a trailing side wherein said leading side has a cutting edge; and a blade housing wall having an interface with said leading side wherein said blade housing wall is at an angle of between 80 and 100 degrees relative to said plane of said cutting blade;

wherein said cutting blade shares an axis of rotation with said blade housing about said trimmer blade assembly;

wherein said cutting blade further comprises a blade circular opening in which resides said axis of rotation;

wherein said blade housing further comprises a housing circular opening in which resides said axis of rotation; and propelling vegetation away from said blade using said blade housing wall.

2. The method according to claim 1, wherein each said blade assembly has a second blade housing wall perpendicular to said plane of said cutting blade and propelling vegetation away from said second blade housing wall.

3. The method according to claim 1 further comprising the step of:

simultaneously rotating said blade housing and said cutting blade in coinciding arcs about said axis of rotation; and wherein said blade housing wall is at an angle of between 85 and 95 degrees relative to said plane of said cutting blade, and wherein said blade housing wall connects a top side of said blade housing and a bottom side of said blade housing.

4. A trimmer head comprising a shaft axis about which rotates at least two rotatable trimmer blade assemblies, each assembly comprising:

a substantially planar trimmer blade comprising a metal blade having an axis of rotation within a blade circular opening on said metal blade, a blade housing substantially encasing said metal blade, said blade housing having a housing circular opening and sharing said axis of rotation with said metal blade, a blade leading edge and means for propelling cut vegetation away from said cutting blade wherein said means comprises a blade housing surface abutting said blade leading edge wherein said blade housing surface is at an 80 to 100 degree angle relative to said trimmer blade, and wherein said leading edge contacts said vegetation prior to said blade housing surface contacting said vegetation.

5. The trimmer head to claim 4 wherein said blade housing surface is at an 85 to 95 degree angle relative to said trimmer blade, and wherein said means for propelling cut vegetation additionally comprises a second surface perpendicular to said trimmer blade.

6. A trimmer head comprising rotatable about a shaft axis and about which rotates at least two trimmer rotatable blade assemblies, each assembly comprising:

a blade pivotable about a point of rotation, wherein said blade comprises a hole encircling said point of rotation;

a housing encasing substantially all of said blade, wherein said housing has a hole encircling said point of rotation, a longitudinal distance, and wherein said blade extends at least 90 percent the longitudinal distance of said housing, and wherein said housing is pennanently affixed to and molded around said housing.

7. The trimmer head according to claim 6, wherein said blade is substantially planar and abuts a blade housing surface at an 80 to 100 degree angle relative to said blade plane.

8. The trimmer head blade according to claim 7, wherein said angle is between 85 and 95 degrees.

9. The trimmer head according to claim 7 wherein said angle is between 87 and 93 degrees.

10. The trimmer head blade according to claim 6 wherein said blade is substantially planar, said blade having a leading side and a trailing side wherein said leading side has a cutting edge;

a blade housing wall wherein said blade housing wall interfaces with said leading side at an angle of between 80 and 100 degrees relative to said plane of said cutting blade.

11. The trimmer head blade according to claim 10 wherein said angle is between 85 and 95 degrees.

12. The trimmer head blade according to claim 10 wherein said angle is between 87 and 93 degrees.

* * * * *

UNITED STATES PATENT AND TRADEMARK OFFICE
CERTIFICATE OF CORRECTION

PATENT NO. : 7,290,383 B2  Page 1 of 1
APPLICATION NO. : 10/933953
DATED : November 6, 2007
INVENTOR(S) : David Harris It is certified that error appears in the above-identified patent and that said Letters Patent is hereby corrected as shown below:

Claim 6, Col. 3, line 29-Col. 4, line 9; should read:

A trimmer head rotatable about a shaft axis
and about which rotates at least two trimmer rotatable blade 30
assemblies, each assembly comprising:
a blade pivotable about a point of rotation, wherein said
blade comprises a hole encircling said point of rotation;
a housing encasing substantially all of said blade,
wherein said housing has a hole encircling said point of
rotation, a longitudinal distance, and wherein said blade
extends at least 90 percent the longitudinal distance of
said housing, and wherein said housing is permanently
affixed to and molded around said housing.

Signed and Sealed this

Ninth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,290,383 B2
APPLICATION NO. : 10/933953
DATED : November 6, 2007
INVENTOR(S) : David Harris It is certified that error appears in the above-identified patent and that said Letters Patent is hereby corrected as shown below:

Claim 6, Col. 3, line 29-Col. 4, line 9; should read:

A trimmer head rotatable about a shaft axis
and about which rotates at least two trimmer rotatable blade
assemblies, each assembly comprising:
a blade pivotable about a point of rotation, wherein said
blade comprises a hole encircling said point of rotation;
a housing encasing substantially all of said blade,
wherein said housing has a hole encircling said point of
rotation, a longitudinal distance, and wherein said blade
extends at least 90 percent the longitudinal distance of
said housing, and wherein said housing is permanently
affixed to and molded around said housing.

This certificate supersedes the Certificate of Correction issued June 9, 2009.

Signed and Sealed this

Seventh Day of July, 2009

JOHN DOLL
*Acting Director of the United States Patent and Trademark Office*